United States Patent [19]

Antoshenkov

[11] Patent Number: 5,495,608
[45] Date of Patent: Feb. 27, 1996

[54] DYNAMIC INDEX RETRIEVAL, BIT MAPPING, AND OPTIMIZATION OF A SINGLE RELATION ACCESS

[75] Inventor: Gennady Antoshenkov, Amherst, N.H.

[73] Assignee: Oracle Corporation, Redwood Shores, Calif.

[21] Appl. No.: 280,146

[22] Filed: Jul. 25, 1994

Related U.S. Application Data

[63] Continuation of Ser. No. 487,011, Feb. 27, 1990, abandoned.

[51] Int. Cl.$^6$ ..................................................... G06F 17/30
[52] U.S. Cl. ................. 395/600; 364/419.19; 364/974.4; 364/974.6; 364/283.4; 364/DIG. 2
[58] Field of Search .................................. 395/425, 600, 395/800, 200, 600; 364/419.19

[56] References Cited

U.S. PATENT DOCUMENTS

| | | | |
|---|---|---|---|
| 3,964,029 | 6/1976 | Babb | 395/800 |
| 4,451,901 | 5/1984 | Wolfe et al. | 395/600 |
| 4,468,728 | 8/1984 | Wang | 395/600 |
| 5,043,872 | 8/1991 | Cheng et al. | 345/600 |
| 5,089,985 | 2/1992 | Chang et al. | 395/600 |
| 5,091,852 | 2/1992 | Tsukhida et al. | 395/600 |

OTHER PUBLICATIONS

"Adaptive Access Plan For Select Queries with Multiple Predicates", IBM Technical Disclosure Bulletin, vol. 32, No. 8B, Jan. 1990. pp. 6–10.
"Dynamic Access Path Determination for Tuple Selection", IBM Technical Disclosure Bulletin, vol. 31, No. 2, Jul. 1988, pp. 249–252.
Lee et al., "Adaptive Selection of Access Path and Join Method", The Thirteenth Annual International Computer Software & Applications Conference, Sep. 22, 1989, pp. 250–256.
B. Bloom, "Space/Time Trade-offs in Hash Coding with Allowable Errors", Association for Computer Machinery Communications, 1970, vol. 13, No. 7, pp. 422–426.
E. Babb, "Implementing a Relational Database by Means of Specialized Hardware", ACM Transactions on Database Systems, 1979, vol. 4, No. 1, pp. 1–29.
G. Graefe, K. Ward, "Dynamic Query Evaluation Plans", Proceedings of the 1989 ACM SIGMOD International Conference on the Management of Data, 1989, vol. 18, No. 2, pp. 358–366.
Ramesh et al. "Variable Depth Trie Index Optimization: Theory and Results, *ACM Trans on Databases Systems*", vol. 14, No. 1, Mar. 1989 pp. 41–74.
Donald E. Knuth, *The Art of Computer Programming: vol. 3/ Sorting and Searching*, Addison–Wesley Publishing Company, (Reading, Mass., 1973), pp. 550–567.
Ron Ashany, "Application of Sparse Matrix Techniques to Search, Retrieval, Classification and Relationship Analysis in Large Data Base Systems–SPARCOM", *Fourth International Conference on Very Large Databases*, West Berlin, Germany, Sep. 13–15, 1978, pp. 419–516.
Jeff Winchell, "Rushmore's Bald Spot", *DBMS vol. 4, No. 10*, Sep., 1991, p. 58.
Jeff Wincell, "dBASE IV 2.0 Query Innovations: Borland's latest dBASE Release: On the Forefront of Bitmap Index Optimization", *DBMS*, vol. 6, No. 10, Sep., 1993, pp. 68–71.
Hamilton, D. D., *Inside Adabas*, WH&O International (Wellesley, Mass., 1991), pp. 27–36, 49–51, 56–65.

*Primary Examiner*—Thomas G. Black
*Assistant Examiner*—Paul R. Lintz
*Attorney, Agent, or Firm*—Fish & Richardson

[57] ABSTRACT

Dynamic optimization of a database access. During execution, based on the actual number of retrieved keys, or on the actual number of fetches (I/O operations) used to retrieve keys, a decision is made between alternative paths for completing the access. The invention features deciding not to retrieve records using the keys retrieved using a particular index if that retrieval could be expected to take longer than retrieving all records. A second index scan is begun during the first index scan, and a decision between alternative paths is made based on the number of keys retrieved during the second scan, or on the number of fetches incurred in the second scan. Scanning of an index is terminated if the number of retrieved keys exceeds a threshold corresponding to the point at which record retrieval using keys is likely to be more costly than full record retrieval. If all index scans are terminated, a full, sequential retrieval of all records is done.

44 Claims, 5 Drawing Sheets

DYNAMIC INDEX RETRIEVAL, BIT MAPPING, AND OPTIMIZATION OF A SINGLE RELATION ACCESS

This is a continuation of application Ser. No. 07/487,011, filed Feb. 27, 1990, now abandoned.

BACKGROUND OF THE INVENTION

The invention relates to retrieving records from a computer database.

Figure 1A:
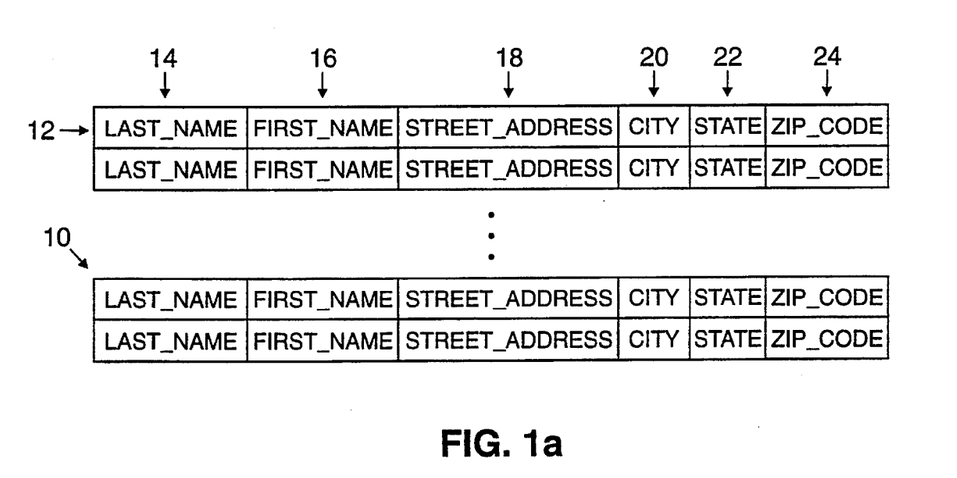
FIGS. 1a and 1b are block diagrams of a simple database table and index file structure.

A computer database typically contains tables having a number of records filled with data. See, for example, an example database table 10 shown in block diagram form in FIG. 1a. Each record 12 in the table 10 can be thought of as a row of the table and contains a number of fields of data. For example, each record in a client database likely contains a LAST_NAME field 14, a FIRST_NAME field 16, a STREET_ADDRESS field 18, a CITY field 20, a STATE field 22, and a ZIP_CODE field 24. In addition, each record also has a database key, i.e., an address at which it is stored in the database file.

Figure 1B:
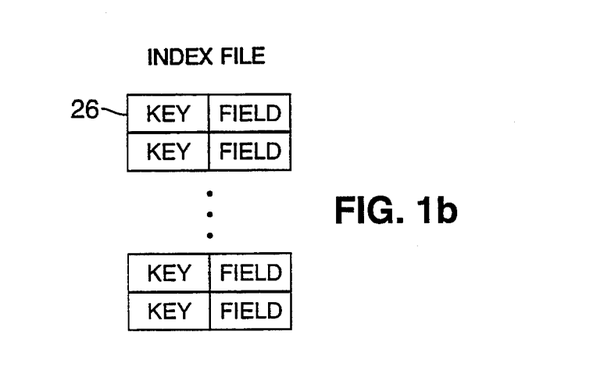

In order to facilitate retrieval of records from a table, some of the fields are "indexed" by their record's key. That is, a separate index file for each indexed field contains a sorted list of keys for all of the records in the database. See, for example, a series of index files 26 shown in block diagram form in FIG. 1b. The keys 28 in each index file are sorted according to the contents of the indexed field, either in ascending or descending order. For example, an index file for the indexed field LAST_NAME contains the keys for all of the records in the client database sorted by the contents of the LAST_NAME field. Likewise, an index file for the indexed field ZIP_CODE contains the keys for all of the records in the client database sorted by the contents of the ZIP_CODE field. In this way, the records in the database can be retrieved in sorted order. For example, by reading through the index file for the indexed field LAST_NAME and retrieving the record to which each successive key points, one can retrieve the database records sorted by name. Likewise, by reading through the index file for the indexed field ZIP_CODE and retrieving the record to which each successive key points, one can retrieve the database records sorted by zip code.

It is further possible to index several fields at once as a group of fields, i.e., an "index only" field. Thus, retrieval of an index only field retrieves several fields at once, which is sometimes convenient when retrieving two closely related fields such as LAST_NAME and FIRST_NAME or YEAR and DATE.

Once the records are entered in the database and the index files are generated, a user may submit queries to the database in order to retrieve a single record or numerous records. For example, the user might wish to retrieve the record for a number of clients, all of whom are named "Smith". Therefore, he enters a query to retrieve a record in which the contents of the LAST_NAME field are "Smith". Since LAST_NAME is an indexed field, the database system can go directly to the name "Smith" in the index file, and retrieve each record having "Smith" in its LAST_NAME field. On the other hand, the user might, for example, wish to send a metered mailing to all of the clients announcing a change of address. In such a case, the user would enter a query to retrieve all records by ZIP_CODE.

As might be expected, performance of a database, e.g., the time it takes to retrieve records, is directly related to the number of records in the database and the complexity of the query. In present database systems, efforts are made to optimize an execution strategy and to minimize retrieval time. A single, optimized execution strategy is generated by a high level language compiler and executed by the database system in the same way for every database access. If the strategy is inefficient or in error, then the actual performance of the database can suffer.

For example, a database query is compiled in the same way, according to the same execution plan, every time it is compiled, regardless of the actual number of records it retrieves. A high level language compiler which compiles each database query before executing it includes three components: (1) a parser which translates ASCII tokens, e.g., Pascal code, into internal definitions which are easily "shuffled"; (2) an optimizer which shuffles the definitions to perform logical optimization, does an extensive combinatorial search of all or a substantial portion of all possible combinations between the operators, and creates an execution plan which is typically a tree of operations; and (3) a code generator which finalizes the plan and creates machine executable code.

Once the query is compiled, an executor executes the plan by walking the tree and executing the operations found therein. The tree is walked strictly according to the execution plan. For example, queries to perform operations on various database records almost always require that the database program retrieve the record. Record retrieval, which occurs at each leaf node of the tree, is done either by an indexed retrieval method or by a sequential retrieval method, a choice that was made when the plan was created. But, depending on the peculiarities of a query and circumstances such as data distribution or the number of retrievals to be done, one access method is more efficient than the other. And it is difficult, if not impossible, to predict how many records are going to be retrieved at each leaf. For example, there could be zero, ten, a thousand, or more records at any one leaf. Thus, strictly following the execution plan can prove to be very inefficient. It also follows that the larger the tree, the more inefficient the operation.

SUMMARY OF THE INVENTION

In general the invention features dynamic optimization of a database access. During execution, based on the actual number of retrieved keys, or on the actual number of fetches (I/O operations) used to retrieve keys, a decision is made between alternative paths for completing the access.

If preferred embodiments, the invention features deciding not to retrieve records using the keys retrieved using a particular index if that retrieval could be expected to take longer than retrieving all records. A second index scan is begun during the first index scan, and a decision between alternative paths is made based on the number of keys retrieved during the second scan, or on the number of fetches incurred in the second scan. Scanning of an index is terminated if the number of retrieved keys exceeds a threshold corresponding to the point at which record retrieval using keys is likely to be more costly than full record retrieval. If all index scans are terminated, a full, sequential retrieval of all records is done. The thresholds for different indexes can be the same, but preferably higher thresholds are used for initial indexes to compensate for the fact that filtering (ANDing) with keys retrieved in subsequent scans is likely to reduce the number of keys. Index scans are done in decreasing order of promise, i.e., most promising indexes (those likely to retrieve the fewest keys) are scanned first, and less promising indexes can be scanned more slowly. If a very small number of keys is retrieved in a scan (e.g., less than 10), a decision is made to abandon any further scans and to retrieve records for all of the retrieved keys. A scan is terminated if the actual number of fetches exceeds a fraction (e.g., ½) of the number of fetches required to retrieve all records, or if it exceeds a fraction (e.g., ½) of the actual number of fetches incurred in the prior scan; the first mentioned fraction is reduced geometrically so that the total number of fetches incurred in all scans does not exceed the number required to retrieve all records.

The invention performs index-only retrievals (where indexed fields are delivered, instead of full records) by (1) delivering fields as keys are retrieved during the index-only scan; (2) beginning a second index scan during the index-only scan; and (3) if the second scan is completed before the index-only scan and delivery is completed, terminating the index-only scan and completing delivery of index fields using fields retrieved during the second index scan.

The invention performs sorted-order retrievals by (1) retrieving and delivering records as keys are retrieved in a first index scan; 2) beginning a second index scan before completion of the first index scan; and (3) filtering keys retrieved in the first index scan against keys retrieved in the second scan if the second scan is completed before the first scan is completed.

The invention performs a database access in which "fast first" retrieval is desired by not waiting to complete an index scan before beginning to retrieve and deliver records.

The goal of single table access dynamic optimization is to increase the actual runtime performance of a database, e.g., VAX Rdb, by increasing the speed at which the database completes its retrieval of records from the database, so that it is closer to the theoretical limit of runtime performance.

In addition, dynamic optimization provides the flexibility to combine multiple index files in order to reduce the number of records retrieved and separately addresses the issues of optimizing the time it take to retrieve all records (referred to as Total Time optimization) and optimizing the time it takes to retrieve a first few records (referred to as Fast First optimization).

Other advantages and features will become apparent from the following description, and from the claims.

DESCRIPTION OF THE PREFERRED EMBODIMENT

Indexed retrieval of a record is done by using the key to the record to retrieve the page in memory on which the record is stored and thus retrieve the record. Retrieving a page of memory is an expensive I/O operation, but fast enough to be worthwhile in retrieving relatively small numbers of records. In cases where two records to be retrieved are stored on the same page, an indexed retrieval retrieves the same page twice. If retrieving only a few records, the overhead of hitting the same page more than once is negligible. But, if a query retrieves many records, and the records are randomly distributed throughout the pages, then the overhead of indexed retrieval is no longer profitable. Sequential retrieval, on the other hand, is done by retrieving successive records, page by page. Sequential retrieval is a brute force method which reads every record. However, when retrieving relatively large numbers of records, it is faster than using indexed retrieval because the process never incurs extra overhead to retrieve the same page twice.

By default, dynamic optimization begins retrieving records by indexed retrieval, which is satisfactory in cases where the number of records to be retrieved is relatively small. For example, one simple query case is an index only retrieval in which the query has one condition and that condition relates to an indexed group field, e.g., FIND CLIENT WHERE LAST_NAME="Abercrombie". The process can go directly to the index file for the LAST_NAME field, locate the key for "Abercrombie", and retrieve the relatively few records that satisfy the query. In addition, as a part of the index only retrieval, the process retrieves the fields which are grouped with the last name.

However, in cases where the number of records to be retrieved is relatively large, i.e., greater than some predefined threshold value such as the number of pages in memory occupied by database records, then dynamic optimization switches the retrieval strategy from indexed retrieval of records from the keys of one index to indexed retrieval of records from the keys of another index, or switches the strategy from indexed retrieval to sequential retrieval. For example, a simple query case in which the query has a condition that condition relates to an indexed group of fields may retrieve so many records that it is more efficient to switch to a different index file having a shorter list of matching keys. Likewise, a query such as FIND CLIENT WHERE LAST_NAME="Smith" may retrieve a very large number of records and may cause dynamic optimization to switch to sequential retrieval. This is simply because it would be more efficient to retrieve all of the records straight out by sequential retrieval than to retrieve records by indexed retrieval at random parts of memory possibly incurring tremendous overhead.

If more than one index scan is to be performed, the index threshold, i.e., the point at which sequential retrieval is deemed to be more efficient than indexed retrieval, is enlarged to take account of the expected reduction in numbers of keys from filtering the key lists retrieved in each scan. The index threshold used is the greater of either the sequential threshold, i.e., the number of keys at which random access to records is equal in cost to reading all records, or the min(table cardinality/2, sqrt(sequential threshold*table cardinality), i.e., the lesser of half the number of records in the table or the square root of the sequential threshold times the number of records in the table.

Other query cases are more complex than those described above. For example, some queries involve Boolean operations on two or more indexed fields, e.g., FIND ALL CLIENTS WHERE LAST_NAME="Smith" AND ZIP_CODE="02111". In such cases, it is possible to retrieve the matching keys from both index files and merge the results in order to determine which records satisfy the query. For example, if there are 10,000 clients in the "02111" zip code and 1,000 clients named "Smith", then the records which satisfy both conditions of the query are those whose keys appear in both lists of matching keys. In such a case, a prior art process merges or filters the lists, and does an indexed retrieval of records whose keys are found in both lists. But, in more extreme cases, e.g., cases having greater than 10,000 keys in the merged list, the execution plan of the prior art still dictates that the process must exhaust a long list of keys and incur more overhead than necessary if a shorter list of keys exists. Dynamic optimization, on the other hand, provides several switching strategies applicable to typical query cases.

Dynamic optimization's first switching strategy is applicable in query cases where one or more index files can be used to retrieve keys to records whose fields match conditions in the query, but one or more of the fields in the query are not indexed. That is, index only retrieval from one index file is not possible, nor is index only retrieval from merged list of matching keys possible, because at some point, it is absolutely necessary to retrieve records to compare the contents of the non-indexed field of each to those specified in the query. The goal of this switching strategy, then, is to optimize the total time necessary to retrieve the records, compare the contents of the non-indexed field, and deliver the records.

This strategy pertains to a query case where some fields in the query may not be indexed, e.g., the STREET_ADDRESS field in the client database. A non-indexed field can be used to, for example, in the query FIND ALL CLIENTS WHERE LAST_NAME="Smith" and STREET_ADDRESS="10 Main Street." Although the index file for the LAST_NAME field can be used to decrease the number of records that have to be examined, the records matching "Smith" must still be retrieved so that the contents of the STREET_ADDRESS field can be examined. One can imagine this case extended to a query involving many indexed and non-indexed fields. This switching strategy, directed to such cases, is illustrated in flow chart form in FIG. 2.

Figure 2:
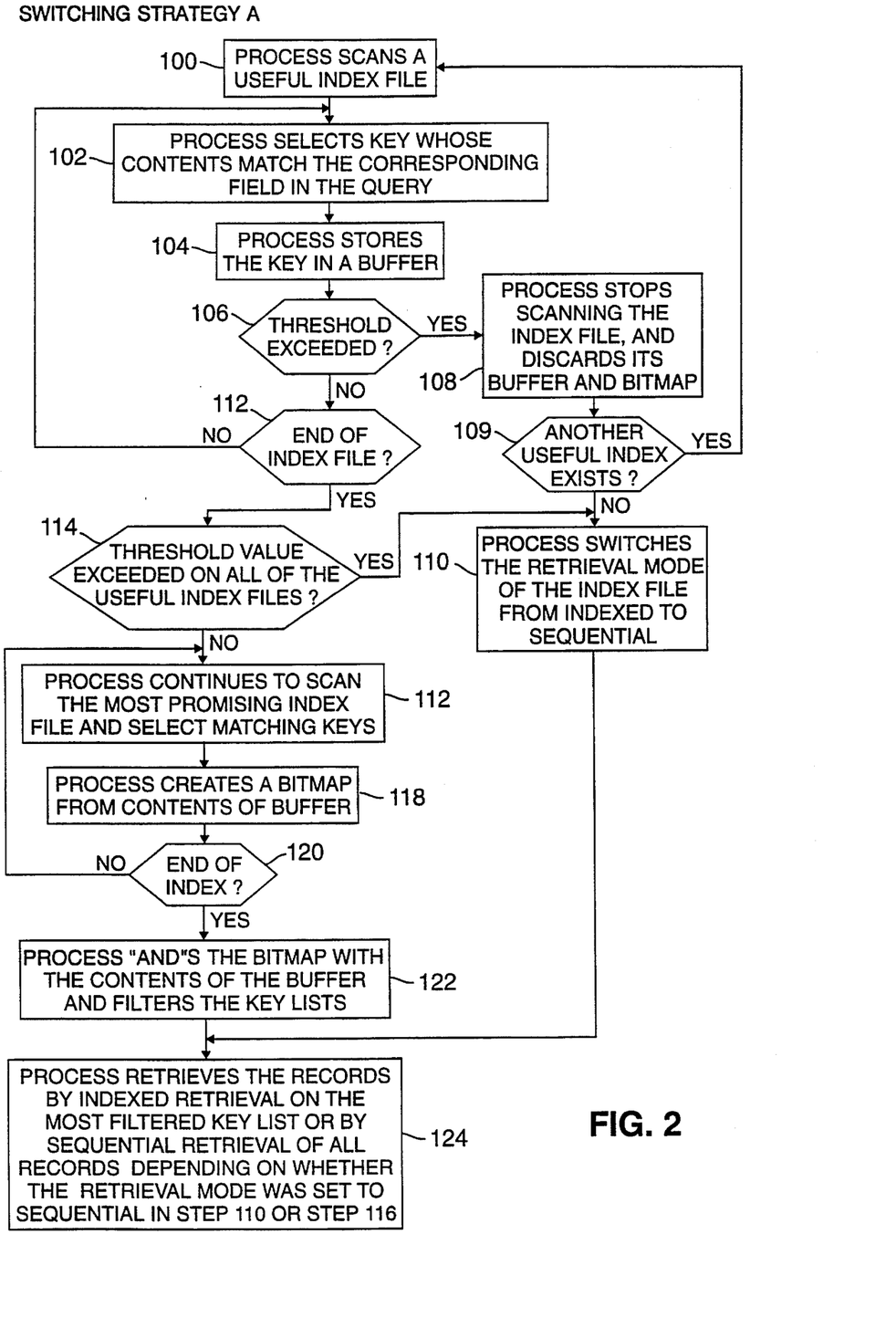
FIG. 2 is a flow chart of one strategy used by the present invention.

Referring to FIG. 2, a process (referred to as a "background" process) scans a useful index file (step 100), i.e., an index file that corresponds to one of the fields in the query. The files are scanned in order of most promising to least promising, i.e., the first index file scanned is the one most likely to have the fewest matching keys. This choice and ordering of indexes is done by the compiler based on a statistical analysis of data in the database and on the probable selection of various Boolean operators. In scanning the index file, the process selects each key whose contents match the corresponding field in the query (step 102) and stores the key in a buffer (step 104). For example, if there are 100 records in the database in which the LAST_NAME field contains "Smith", then in the buffer there is a list of 100 keys that point to those 100 records. If the number of keys in the buffer, however, exceeds a threshold value (step 106), the background process stops scanning the index file and discards its buffer and bitmap (step 108). This threshold value is roughly equivalent to the number of pages in the table because, assuming that the records are randomly distributed throughout the pages, it is less efficient to perform an indexed retrieval of a number of records greater than number of pages than it is to retrieve all of the records by sequential scan. If another useful index does not exist (step 109), then the background process switches the retrieval mode of the index file from indexed to sequential (step 110). Otherwise, if another useful index does exist (step 109), then the process returns to step 100 to scan the index, hoping that it will retrieve fewer keys.

If, however, the process has not exceeded the threshold in step 106, it determines whether it has reached the end of the index file (step 112). If the process has not exceeded the threshold, then it returns to select another key from the index file. Otherwise, if it has exceeded the threshold, then it determines whether the threshold value has been exceeded on all of the index files (step 114). If so, then the retrieval method of the index file is switched from indexed to sequential (step 110) and the process proceeds to step 124.

On the other hand, if in step 114, the threshold has not been exceeded, then the process continues to scan the most promising index file and select matching keys (step 118) and creates a bitmap (or updates an existing bitmap) based on the contents of the buffer (step 119). The process repeats steps 118–119 until it reaches the end of the index (step 120).

Once the process reaches the end of the index (step 120), it "AND"s (filters) the bitmap with the contents of the buffer (step 122). Finally, the process retrieves the records by indexed retrieval on the most filtered key list or by sequential retrieval of all records depending on whether the retrieval mode was set to sequential in step 110 or step 116 (step 124).

A second query case involves one index file that can be used for index only retrieval and other useful indexes which are not for index only retrieval. For example, suppose there is another field in the client record that indicates when the client first contacted the company. A query to determine which clients came to the company on a certain day in a certain range of years might read: FIND ALL CLIENTS WHERE (START_YEAR>"1976" AND START_YEAR<"1987") AND START_DAY="February 29". One way to locate the requested records is to retrieve all of the records for the specified time period and then examine the DAY fields of all of the records. Dynamic optimization does not take this approach. Instead, the process retrieves the DAY field having February 29, and then checks the years. This strategy is illustrated in FIG. 3.

Figure 3:
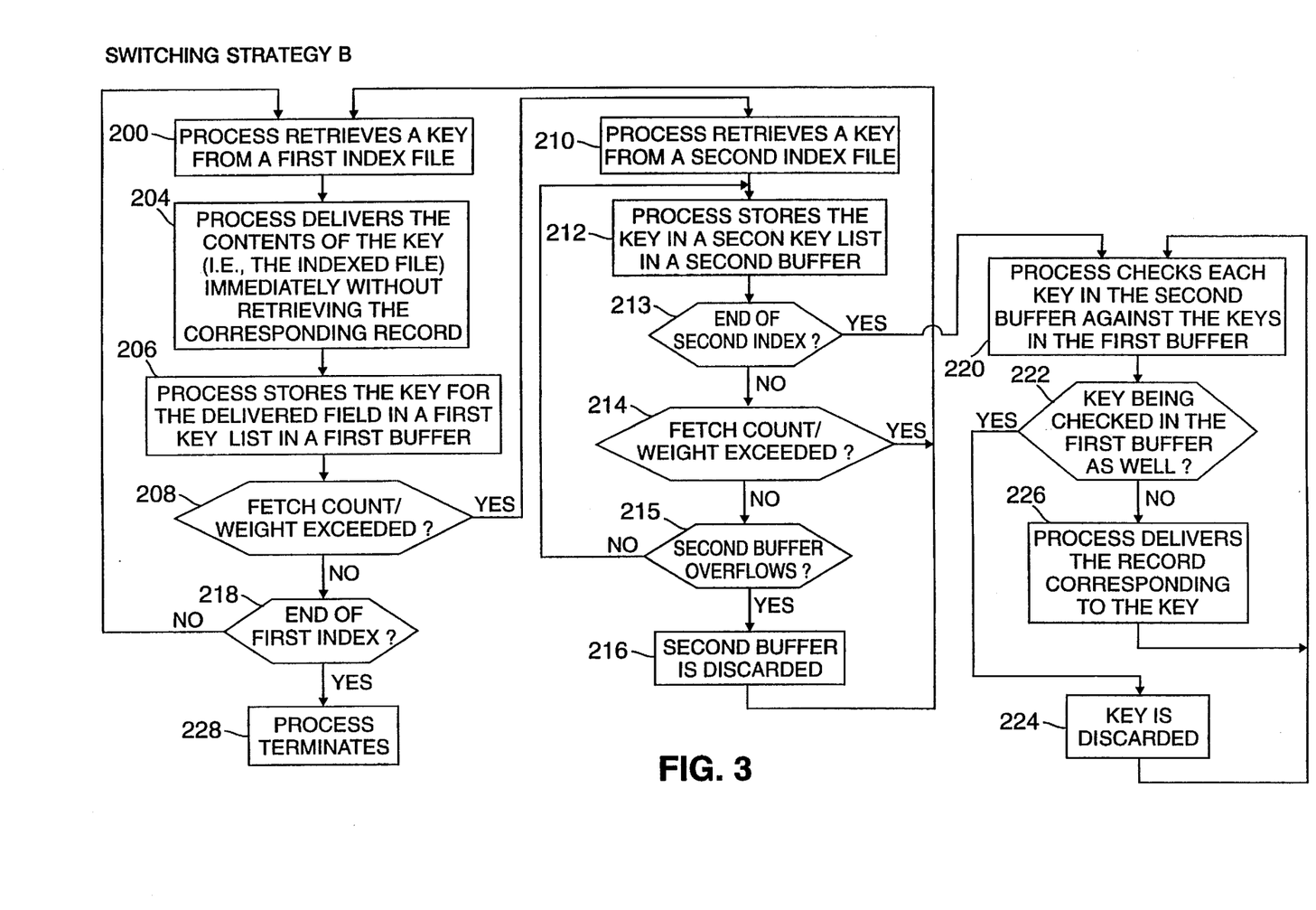
FIG. 3 is a flow chart of a second strategy used by the present invention.

Referring to FIG. 3, a process does an index only retrieval on index only group of fields (step 200), e.g., YEAR and DATE, and delivers the contents of the field immediately without retrieving the records (step 204). The process also stores the key for the delivered field in a first key list in a first buffer (step 206) so that it can later be used to filter keys from a second buffer. This second buffer is opened when the number of fetch operations executed so far in steps 200–206 divided by an integer weight chosen to control the speed at which the process switches between index files, is greater than the number of fetch operations executed in steps 210–212 divided by an integer weight. That is, the process switches from the first to a second index when fetch count/weight for the first index is greater than the fetch count/weight for the second index.

Thus, if in step 208, the fetch count/weight for the first index exceeds the fetch count/weight for the second index, then the process retrieves a key from the second index file (step 210), and stores the key in a second buffer (step 212). The background process thus begins to build a second key list from a non-index only index in the second buffer. Next, if the process has reached the end of the second index (step 213), then it proceeds to step 220 to filter the keys. Otherwise, if the process has not reached the end of the second index, then it determines whether it has exceeded the fetch count/weight (step 214). If so, then the process switches back to scanning the first index at step 200. Otherwise, if the process has not exceeded fetch count/weight, then the process determines if the buffer is full (step 215). If so, the second buffer is discarded (step 216), and the process switches back to the first index, which continues its index only retrieval (steps 200–208) to the end of the index (step 218). Otherwise, if the buffer does not overflow (step 215), the process returns to step 210 to retrieve another key from the second index file.

On the other hand, if in step 208, the process does not exceed fetch count/weight, then it determines whether it has reached the end of the first index (step 218). If so, then the process terminates at step 228. Otherwise, if the process has not reached the end of the first index, then it checks each key in the second buffer against the keys in the first buffer (step 220). If the key being checked is present in the first buffer (step 222), it is discarded (step 224). Otherwise, the process delivers the record (step 226). The strategy is completed when steps 220–226 are repeated for each key in the second buffer and the process terminates at step 228.

A third strategy involves a query where a sorted delivery is needed and a sorted index exists, e.g., query asks for all clients in 02111 ZIP_CODE, sorted by LAST_NAME. This strategy is illustrated in the flow chart of FIG. 4.

Figure 4:
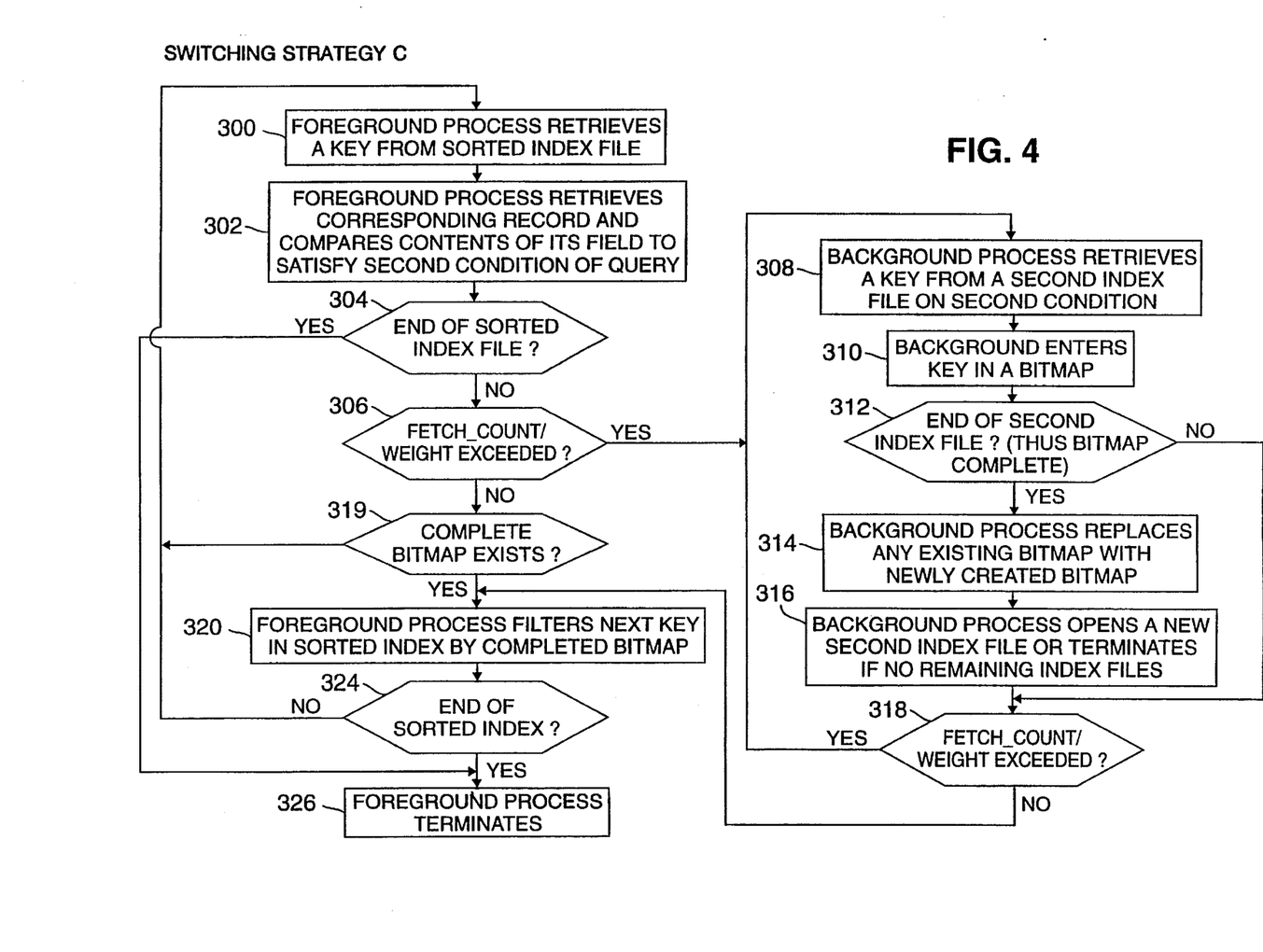
FIG. 4 is a flow chart of a third strategy used by the present invention.

Referring to FIG. 4, the foreground process retrieves records by indexed retrieval from sorted index file (step 300). For example, foreground process might retrieve records sorted by LAST_NAME. The foreground process retrieves the corresponding record and compare the contents of its fields to satisfy any additional query condition (step 302). If, at this point, the process has reached the end of the sorted index file (step 304), then the process terminates in step 326). Otherwise, if the foreground process has not reached the end of the sorted index file, it determines whether it has exceeded the fetch count/weight limit (step 306). If so, the foreground process switches to a background process which retrieves a key from a second index file (step 308), enters the key in a bitmap (step 310), and checks to see if it has reached the end of the second index file (step 312). If the background process has reached the end of the second index file, then it replaces any existing bitmap with the bitmap it has created in step 310 (step 314), opens a new second index file (step 316) or terminates if no other index files exist (step 316). Following step 312 or step 316, the background process determines whether it has exceeded the fetch count/weight limit (step 318). If so, the background process returns control to the foreground process (step 320). Otherwise, if the background process has not exceeded the fetch count/weight limit (step 318), it returns to step 308 to retrieve another key from the second index file.

On the other hand, if the foreground process did not exceed the fetch count/weight limit in step 306, then the it determines whether a complete bitmap exists (step 319). If so, the foregrond process filters any remaining keys in the sorted index against the bitmap (step 320). Otherwise, if a complete bitmap does not exist, then the foreground process returns to step 300 to retrieve another key from the sorted index file. Finally, once the foreground process reaches the end of the sorted index (step 324), it terminates at step 326.

Figure 5:
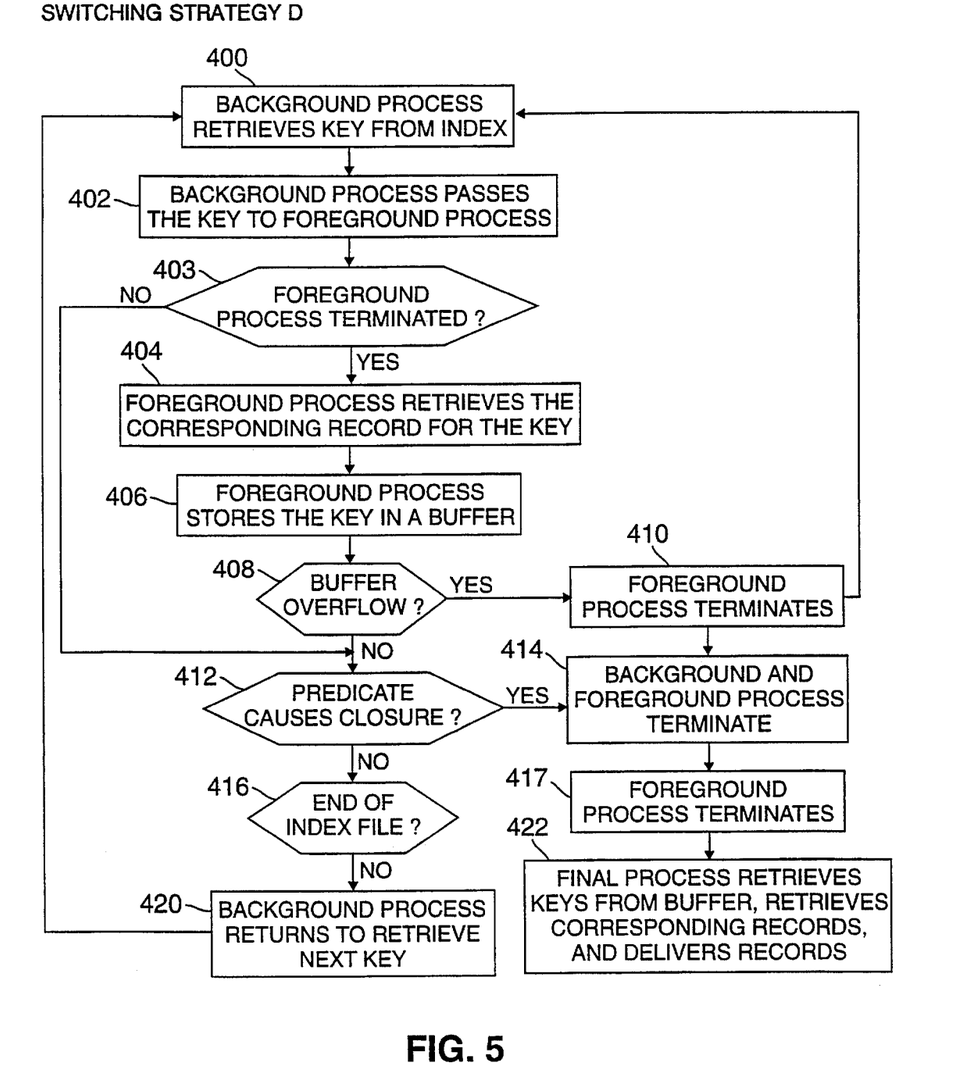
FIG. 5 is a flow chart of a fourth strategy used by the present invention.

The last strategy applies to queries involving one or more useful indexes, none of which is an index only index. The goal of this strategy is to optimize "fast first" retrieval. A fast first retrieval is desired when the query involves a predicate which closes a search before all records matching the query are retrieved. For example, the predicate EXISTS, in a query indicates that the user does not intend to retrieve any records, but that he only wants to know if at least one record matching the conditions in the query exists. Similarly, a "FIRST n" predicate in a query indicates that the user does not intend to retrieve all records that match the conditions in the query, but only that he wants to retrieve the first n records, where n is some integer. This fourth switching strategy is illustrated in FIG. 5.

The background process performs an indexed retrieval of some or all of the keys whose records match the conditions of the query, beginning in step 400 where it retrieve a key from an index file. The background process passes the key to a foreground process (step 402). If the foreground process has not terminated (step 403), then it retrieves the corresponding record for the key (step 404) and stores the key in a buffer (step 406). The background process next determines if the buffer is full (step 408). If so, the foreground process terminates (step 410) and returns to step 400. Otherwise, if the foreground process was not terminated in step 403, or if the buffer was not full in step 408, then the background process determines if a predicate such as "EXISTS" has closed the retrieval (step 412). If so, then both the foreground and background processes terminate (step 414). Otherwise, if a predicate has not cause closure in step 412, then the foreground process determines if it has reached the end of the index file (step 416). If so, then the foreground process terminates (step 417) and a final process retrieves the keys from the buffer, retrieves the corresponding records, and delivers the records (step 422).

On the other hand, if the background process has not reached the end of the index file (step 416), then it returns to step 400 to retrieve the next key in the index file (step 420).

Since the background process is the nucleus of the dynamic optimization it merits additional discussion. The background scans index files and switches from one index file to another when the number of operations for an index scan on the file exceeds a threshold value. The guidelines for parallel index scanning include opening at most two index files at a time, using a 1,000 key buffer, and using a twofold test to discard an index scan. The first part of the test is whether the sequential scan threshold has been exceeded, i.e., whether the number of retrieved keys is so large that retrieval based on them would take as long or longer than full retrieval of all records (see earlier discussion). The second part of the test is whether a fetch limit has been exceeded. The fetch limit is the number of actual page operations ("fetches") incurred in an index scan. For the first index, the fetch limit equals ½ the number of fetches (pages) for a full sequential retrieval. The fetch limit is reduced geometrically for subsequent indexes. For a second index file, the limit is ½ of the actual number of fetches incurred in the first index scan. For a third index, the limit is ½ of the actual number of fetches incurred for the second index scan, and so on. In this way, the total number of index scan fetches is less than the number of fetches required for a full sequential retrieval. Just as importantly, the number of fetches expended on the subsequent index scans, which are expected to be less promising, is less than the number of actual fetches incurred.

To accomplish the switching from a first index to a second, the background process scans one of the two indexes until it is exhausted, its buffer is full, or until it exceeds the threshold or fetch limit. That is, the process scans a first index into a first buffer until (1) the process reaches the end of the first index, or (2) the first buffer is full of matching keys, or (3) the threshold or fetch limit for the first index is exceeded.

In Case 1 for the first index, if the end of the first index is reached, then the keys in all remaining indexes are simply compared to the keys in the first buffer. If a matching key is found, it is marked in the first buffer. Then the first buffer is compressed so that it contains only marked keys. Finally the process retrieves the records for the marked keys. Similarly, for Case 2 for the first index, if the first buffer is full, then the process starts to read a second index into a second buffer until (1) the process reaches the end of the second index, or (2) the second buffer is full, or (3) the threshold or fetch limit for the second index is exceeded. Finally, in Case 3 for the first index, the process discards the first index, copies the second index to first index, copies the second buffer to first buffer, and opens a new second index from among remaining indexes.

The cases for the second index are as follows. In Case 1 for the second index, if the end of the second index is reached, then the keys in all remaining indexes are simply compared to the keys in the second buffer. If a matching key is found, it is marked in the second buffer. Then the second buffer is compressed so that it contains only marked keys. Finally the process retrieves the records for the marked keys.

In Case 2 for the second index, if the second buffer is full, then the process stores the first buffer into a temporary table and returns to reading keys from the first index into the first buffer until (1) the process reaches the end of the first index, or (2) the first buffer is again full of matching keys (at which time it stores the first buffer in a temporary table), or (3) the threshold or fetch limit for the first index is exceeded. Finally, in Case 3 for the second index, if the second index exceeds the threshold or fetch limit then the process discards the second index, assigns one of the remaining indexes to be the new second index and reads the new second into the second buffer until (1) the process reaches the end of the second index, or (2) the second buffer is full of matching keys, or (3) the threshold or fetch limit for the second index is exceeded.

In a further aspect of dynamic optimization, the number of retrieved keys for any index scan is compared to a small threshold, e.g., 10 keys, and if the number of retrieved keys is less than (or equal to) the threshold, all further index scanning is terminated and only the fewer than 10 records is retrieved. It is less costly to do retrieve these few records than to initiate a further index scan, because just the cost of opening the index can be on the order of 3 fetches. The threshold used can be other than 10 fetches (e.g., it could fall in the range of 5–15 fetches, or more preferably 7–13 fetches), and it can be expressed as a ratio of the cost of initiating a further index scan (e.g., 2–4 times the number of fetches to initiate a further scan). If the threshold is exceeded on the second or later index scans, it would be possible to filter the small number of retrieved keys against the earlier retrieved key lists, but this is preferably not done.

Other embodiments are within the following claims.

I claim:

1. A method for use in performing a database access to retrieve data records from a computer stored database table having records, fields and two indexes each corresponding to one of the fields, the method being performed in response to a command having two conditions, a first of the conditions selecting data values of a first indexed field, and a second condition selecting data values of a second and distinct one of the indexed fields, the method comprising the steps of, by computer:

(a) searching the first index for index entries satisfying the first condition, and retrieving record addresses for the index entries satisfying the first condition;

(b) concurrently with step (a), searching the second index for index entries satisfying the second condition, and retrieving record addresses for the index entries satisfying the second condition; and (c) before completion of either of the index searches, based on intermediate counts of record addresses retrieved by steps (a) and (b) or on a number of fetches required to retrieve the records corresponding to the retrieved record addresses, choosing an access path to complete the database access.

2. The method of claim 1 wherein:

the choosing step comprises deciding not to retrieve records using the record addresses retrieved in the first index search if that retrieval could be expected to take longer than retrieving all records.

3. The method of claim 1 wherein the first index search is an index-only retrieval, and the method further comprises the step of delivering index fields as they are retrieved during the first index search;

the second index search is not an index-only retrieval; and the choosing step comprises deciding whether to terminate the first index search and deliver fields using the record addresses retrieved during the second index search.

4. The method of claim 3 wherein:

the decision to terminate the first index search and complete delivery using record addresses retrieved in the second index search is made if the number of record addresses retrieved in the second index search does not exceed a predetermined threshold and the second index search completes prior to completion of the first index search.

5. The method of claim 3 further comprising the step of:

comparing the record addresses retrieved in the second index search to record addresses retrieved in the first index search so that only records not delivered by the first index search are delivered.

6. The method of claim 1 wherein:

records are retrieved and delivered as their record addresses are retrieved by the first index search;

the choosing step comprises deciding whether to filter record addresses retrieved in the first index search against record addresses retrieved in the second index search, and the decision is made to do the filtering after the second index search is complete.

7. The method of claim 6 wherein:

the filtering comprises using a bit map built for the record addresses retrieved in the second index search.

8. A method for use in performing a database access to retrieve data records from a computer stored database table having records, each one of the records having a plurality of fields, the method being performed in response to a command having two conditions, the first condition selecting data values of a first indexed one of the fields, and the second condition selecting data values of a second indexed one of the fields, the method comprising the steps of, by computer:

(a) searching a first index corresponding to the first indexed one of the fields for index entries satisfying the first condition, and retrieving record addresses for the index enteries satisfying the first condition; and (b) concurrently with step (a), searching a second index corresponding to the second indexed one of the fields for index entries satisfying the second condition, and retrieving record addresses for the index entries satisfying the second condition and, (c) using intermediate or complete results of one of the index searches to modify the execution of or terminate the other of the index searches.

9. The method of claim 8 wherein:

the choosing step comprises deciding whether, after completion of the first index search, to initiate a third index search or whether instead to abandon any further index searches and instead retrieve records for which record addresses were retrieved in the first index search.

10. The method of claim 9 wherein:

the decision to abandon any further index searches and retrieve all records using record addresses retrieved in the first index search is made if the number of record addresses retrieved in the first index search is less than a predetermined threshold.

11. The method of claim 8, further comprising the step of:

concurrently with the second index search, retrieving records corresponding to the record addresses retrieved during the second index search.

12. A method for use in performing a database access to retrieve data records from a computer stored database table having records, each one of the records having a plurality of fields, the method being performed in response to a command having two conditions, the first condition selecting data values of a first indexed one of the fields, and the second condition selecting data values of a second indexed one of the fields, the method comprising the steps of, by computer:

(a) searching a first index corresponding to the first indexed one of the fields for index entries satisfying the first condition, and retrieving record addresses for the index enteries satisfying the first condition; and (b) concurrently with step (a), searching a second index corresponding to the second indexed one of the fields for index entries satisfying the second condition, and retrieving record addresses for the index entries satisfying the second condition;

terminating the incomplete second index search; and using the record addresses retrieved by the first index search to retrieve records corresponding to record addresses retrieved by the first index search and not already retrieved during the second index search.

13. The method of claim 12 further comprising the steps of:

building a sorted record address buffer in memory for record addresses retrieved for the first index search; and filtering record addresses retrieved by the second index search against record addresses stored in the buffer.

14. The method of claim 13 further comprising the step of:

comparing the record addresses retrieved in the second index search to record addresses retrieved in the first index search for which fields were delivered so that only fields not delivered in the first index search are delivered.

15. The method of claim 13 further comprising the step of:

building a buffer containing record addresses for which fields are delivered during the first index search, and using that buffer to do the comparing.

16. The method of claim 13, wherein:

the searching and retrieving are performed by a single computer processing unit, the concurrent searching steps being alternately worked by the processing unit.

17. The method of claim 12 wherein:

the records retrieved by the second index search are retrieved without filtering against record addresses retrieved in earlier index searches of the same database access.

18. The method of claim 12 wherein:

the terminating and using steps are initiated if the first index search completes before the second index search completes.

19. A method for use in performing a database access to retrieve data records from a computer stored database table having records, each one of the records having a plurality of fields, the method being performed in response to a command having two conditions, the first condition selecting data values of a first indexed one of the fields, and the second condition selecting data values of a second indexed one of the fields, the method comprising the steps of, by computer:

(a) searching a first index corresponding to the first indexed one of the fields for index entries satisfying the first condition, and retrieving record addresses for the index entries satisfying the first condition;

(b) concurrently with step (a), searching a second index corresponding to the second indexed one of the fields for index entries satisfying the second condition, and retrieving record addresses for the index entries satisfying the second condition;

(c) concurrently with the first index search, building a sorted record address buffer of record addresses retrieved for the first index search;

(d) concurrently with the second index search, retrieving records corresponding to the record addresses retrieved during the second index search, without filtering the record addresses retrieved by the second search against record addresses retrieved by the first search before retrieving the records; and (e) if the first index search completes before the second index search completes:

terminating the incomplete second index search; and using the record address buffer to retrieve records.

20. The method of claim 19, further comprising the step of:

comparing the record addresses retrieved in the second index search to the contents of the record address buffer to remove from the record address buffer addresses of those records already retrieved by the second index search.

21. The method of claim 19, wherein:

the searching and retrieving are performed by a single computer processing unit, the concurrent searching steps being alternately worked by the processing unit.

22. A method for use in performing a database access to retrieve data records from a computer stored database table having records, each one of the records having a plurality of fields, the method being performed in response to a command having two conditions, the first condition selecting data values of a first indexed one of the fields, and the second condition selecting data values of a second indexed one of the fields, the method comprising the steps of, by computer:

(a) searching a first index corresponding to the first indexed one of the fields for index entries satisfying the first condition, and retrieving record addresses for the index enteries satisfying the first condition; and (b) concurrently with step (a), searching a second index corresponding to the second indexed one of the fields for index entries satisfying the second condition, and retrieving record addresses for the index entries satisfying the second condition;

(c) during the first index search, building a record address buffer of the record addresses retrieved by the first index search; and (d) before the second index search completes:

terminating the first index search;

allowing the second index search to continue; and using the record address buffer to filter record addresses retrieved by the second index search before retrieving records corresponding to the record addresses retrieved by the second index search.

23. The method of claim 22, further comprising the step of:

retrieving the records corresponding to the filtered record addresses.

24. The method of claim 22 further comprising the step of:

before commencing the two concurrent index searches, determining that the second index is a sorted index.

25. The method of 22, further comprising the step of:

concurrently with the second index search, retrieving records corresponding to the record addresses retrieved during the second index search.

26. The method of claim 22, wherein:

step (e) is initiated when the first index search completes before the second index search completes.

27. The method of claim 22, wherein:

the searching and retrieving are performed by a single computer processing unit, the concurrent searching steps being alternately worked by the processing unit.

28. A method for use in performing a database access to retrieve data records from a computer stored database table having records, each one of the records having a plurality of fields, the method being performed in response to a command having two conditions, the first condition selecting data values of a first indexed one of the fields, and the second condition selecting data values of a second indexed one of the fields, the method comprising the steps of, by computer:

(a) searching a first index corresponding to the first indexed one of the fields for index entries satisfying the first condition, and retrieving record addresses for the index entries satisfying the first condition; and (b) concurrently with step (a), searching a second index corresponding to the second indexed one of the fields for index entries satisfying the second condition, and retrieving record addresses for the index entries satisfying the second condition;

before commencing the two concurrent index searches, determining that the second index is a sorted index;

during the first index search, storing the record addresses retrieved by the first index search in a record address buffer;

concurrently with the second index search, retrieving records corresponding to the record addresses retrieved during the second index search; and before the second index search completes:

terminating the first index search;

allowing the second index search to continue, but modifying its execution to use the record address buffer to filter record addresses retrieved by the second index search before retrieving records corresponding to the record addresses retrieved by the second index search; and retrieving the records corresponding to the filtered record addresses.

29. The method of claim 28, wherein:

the searching and retrieving are performed by a single computer processing unit, the concurrent searching steps being alternately worked by the processing unit.

30. A method for use in performing a database access to retrieve data records from a computer stored database table having records, each one of the records having a plurality of fields, the method being performed in response to a command having two conditions, the first condition selecting data values of a first indexed one of the fields, and the second condition selecting data values of a second indexed one of the fields, the method comprising the steps of, by computer:

(a) searching a first index corresponding to the first indexed one of the fields for index entries satisfying the first condition, and retrieving record addresses for the index enteries satisfying the first condition; and (b) concurrently with step (a), searching a second index corresponding to the second indexed one of the fields for index entries satisfying the second condition, and retrieving record addresses for the index entries satisfying the second condition;

if the first index search completes before the second index search completes:

terminating the second index search without allowing the second index search to complete; and retrieving the records corresponding to the record addresses retrieved by the first index search.

31. The method of claim 30 wherein:

the second index search searches an index containing all fields to be retrieved by the database access.

32. The method of 30, further comprising the step of:

during the first index search, building a record address buffer of the record addresses retrieved by the first index search.

33. The method of claim 32, further comprising the step of:

before retrieving the records corresponding to the record addresses retrieved by the first index search, filtering the record addresses by matching against the record addresses retrieved by the second index search.

34. The method of claim 30, wherein:

the searching and retrieving are performed by a single computer processing unit, the concurrent searching steps being alternately worked by the processing unit.

35. A method for use in performing a database access to retrieve data records from a computer stored database table having records, each one of the records having a plurality of fields, the method being performed in response to a command having two conditions, the first condition selecting data values of a first indexed one of the fields, and the second condition selecting data values of a second indexed one of the fields, the method comprising the steps of, by computer:

(a) searching a first index corresponding to the first indexed one of the fields for index entries satisfying the first condition, and retrieving record addresses for the index enteries satisfying the first condition; and (b) concurrently with step (a), searching a second index corresponding to the second indexed one of the fields for index entries satisfying the second condition, and retrieving record addresses for the index entries satisfying the second condition;

during the first index search, storing the record addresses retrieved by the first index search in a storage buffer;

if the second index search, being a search of an index containing all fields to be retrieved by the database access, completes before the first index search, terminating the first index search without allowing the first index search to complete; and if the first index search completes before the second index search completes:

terminating the second index search without allowing the second index search to complete;

retrieving the records corresponding to the record addresses stored in the record address buffer; and applying the condition of the second search to the retrieved records before delivery.

36. The method of claim 35, wherein:

the searching and retrieving are performed by a single computer processing unit, the concurrent searching steps being alternately worked by the processing unit.

37. A method for use in performing a database access to retrieve data records from a computer stored database table having records, each one of the records having a plurality of fields, the method being performed in response to a command having two conditions, the first condition selecting data values of a first indexed one of the fields, and the second condition selecting data values of a second indexed one of the fields, the method comprising the steps of, by computer:

(a) searching a first index corresponding to the first indexed one of the fields for index entries satisfying the first condition, and retrieving record addresses for the index enteries satisfying the first condition; and (b) concurrently with step (a), searching a second index corresponding to the second indexed one of the fields for index entries satisfying the second condition, and retrieving record addresses for the index entries satisfying the second condition; and wherein:

a control for apportioning search effort between the first and second index searches ensures that a rate at which the first index is searched is on average greater than a rate at which the second index is searched.

38. The method of claim 37, wherein:

the apportioning is accomplished by iteratively repeating the steps of:

searching a first predetermined number of entries of the first index; and searching a second predetermined number of entries of the second index.

39. A method for use in performing a database access to retrieve data records from a computer stored database table having records, each one of the records having a plurality of fields, the method being performed in response to a command having two conditions, the first condition selecting data values of a first indexed one of the fields, and the second condition selecting data values of a second indexed one of the fields, the method comprising the steps of, by computer:

(a) searching a first index corresponding to the first indexed one of the fields for index entries satisfying the first condition, and retrieving record addresses for the index enteries satisfying the first condition; and (b) concurrently with step (a), searching a second index corresponding to the second indexed one of the fields for index entries satisfying the second condition, and retrieving record addresses for the index entries satisfying the second condition further comprising the step of;

filtering lists of record addresses retrieved by different index searches to produce a final list of record addresses appearing on all lists; and wherein:

the step of filtering lists of record addresses is carried out by (1) building in memory a sorted record address buffer of record addresses retrieved from the first index and (2) comparing record addresses retrieved from the second index to record addresses stored in the buffer.

40. A method for use in performing a database access to retrieve data records from a computer stored database table having records, each one of the records having a plurality of fields, the method being performed in response to a command having two conditions, the first condition selecting data values of a first indexed one of the fields, and the second condition selecting data values of a second indexed one of the fields, the method comprising the steps of, by computer:

(a) searching a first index corresponding to the first indexed one of the fields for index entries satisfying the first condition, and retrieving record addresses for the index enteries satisfying the first condition; and (b) concurrently with step (a), searching a second index corresponding to the second indexed one of the fields for index entries satisfying the second condition, and retrieving record addresses for the index entries satisfying the second condition; and wherein:

the first and second index searches have been preceded by an earlier index search for which a number of record addresses retrieved exceeded a threshold value at which the search strategy of the earlier search was modified.

41. The method of claim 40 wherein:

the records for which record addresses are retrieved in the first index search are retrieved without filtering with record addresses retrieved in earlier index searches.

42. A method for use in performing a database access to retrieve data records from a computer stored database table having records, each one of the records having a plurality of fields, the method being performed in response to a command having two conditions, the first condition selecting data values of a first indexed one of the fields, and the second condition selecting data values of a second indexed one of the fields, the method comprising the steps of, by computer:

(a) searching a first index corresponding to the first indexed one of the fields for index entries satisfying the first condition, and retrieving record addresses for the index enteries satisfying the first condition; and (b) concurrently with step (a), searching a second index corresponding to the second indexed one of the fields for index entries satisfying the second condition, and retrieving record addresses for the index entries satisfying the second condition; and deciding to terminate one of the index searches if a number of record addresses retrieved by the index search to be terminated exceeds a fetch limit, the fetch limit being less than a number of fetches required to retrieve all of the records in the database table.

43. The method of claim 42 wherein:

the fetch limit is approximately equal to or less than one-half of the number of fetches required to retrieve all of the records in the database table.

44. The method of claim 42 wherein:

the deciding step comprises the further decision of whether to terminate the second index search and initiate or continue a subsequent index search, and the decision is affirmative if the actual number of fetches required to retrieve records addressed in the second index search exceeds a second fetch limit smaller than the first fetch limit.

* * * * *